United States Patent [19]
Goldswain et al.

[11] Patent Number: 6,116,610
[45] Date of Patent: Sep. 12, 2000

[54] SPRING ENERGIZED PLASTIC SEALS

[75] Inventors: Ian Martyn Goldswain, Maidenhead; Lev Uryevich Roberts, Staines, both of United Kingdom

[73] Assignee: John Crane (UK) Limited, Slough, United Kingdom

[21] Appl. No.: 09/048,172

[22] Filed: Mar. 25, 1998

[30] Foreign Application Priority Data

Mar. 25, 1997 [GB] United Kingdom .................. 9706172

[51] Int. Cl.⁷ ...................................... F16J 15/32
[52] U.S. Cl. .......................... 277/395; 277/564; 277/584
[58] Field of Search ................... 277/390, 394, 277/395, 397, 554, 564, 584

[56] References Cited

U.S. PATENT DOCUMENTS

| | | |
|---|---|---|
| 1,331,216 | 2/1920 | Schneider . |
| 2,168,818 | 8/1939 | Condon . |
| 3,897,957 | 8/1975 | Warner . |
| 4,133,542 | 1/1979 | Janian et al. . |
| 4,262,915 | 4/1981 | Williams . |
| 4,489,916 | 12/1984 | Stevens ................................... 277/540 |
| 4,601,235 | 7/1986 | Roberts . |
| 4,623,153 | 11/1986 | Nagasawa ................................ 277/551 |
| 5,163,692 | 11/1992 | Schofield et al. . |
| 5,368,312 | 11/1994 | Voit et al. . |
| 5,370,403 | 12/1994 | Sedy . |
| 5,813,674 | 9/1998 | Dickie et al. . |

FOREIGN PATENT DOCUMENTS

| | | |
|---|---|---|
| 0168162 A1 | 1/1986 | European Pat. Off. . |
| 0178070 A1 | 4/1986 | European Pat. Off. . |

*Primary Examiner*—Anthony Knight
*Assistant Examiner*—John L. Beres
*Attorney, Agent, or Firm*—Davis and Bujold

[57] ABSTRACT

A seal between a pair of relatively axially movable coaxial components is provided by a spring energised plastic seal which is located axially with respect to the outer component to separate a high pressure fluid area from a low pressure fluid area, the spring energised plastic seal has a plastic ring, the plastic ring defining a body portion and a pair of sealing elements, the sealing elements extending coaxially to the high pressure side of the body portion and being spaced radially by spring means, into sealing engagement with opposed surfaces of the two components, a projection extending axially from the low pressure side of the body portion adjacent the external diameter thereof, said projection engaging an axial projection on the outer component so that engagement thereof will support the plastic ring radially.

17 Claims, 2 Drawing Sheets

SPRING ENERGIZED PLASTIC SEALS

The present invention relates to spring energised plastic seals.

BACKGROUND OF THE INVENTION

In mechanical seals, where, for example a first sealing ring is mounted in fixed axial and rotational relationship on a shaft and a second sealing ring is mounted in fixed rotational relationship to a housing, the second sealing ring being movable axially of the housing, so that it may be urged axially into sealing engagement with the first sealing ring, there is a requirement to provide a secondary seal between the second sealing ring and the housing, which will permit axial sliding of the second sealing ring.

Hitherto, spring energised plastic seals have been used for this purpose. Such seals comprise a plastic ring defining a pair of sealing elements, the sealing elements being urged apart by spring means. The spring energised plastic seal is located in an annular groove in the housing, one sealing element being urged into sealing engagement with the base of the groove and the other sealing element being urged into sealing engagement with the second sealing ring. The plastic ring is disposed so that the pressure of fluid sealed, will reinforce the load applied on the sealing elements by the spring means.

When spring energised plastic seals of this type are subject to high temperatures and pressures, the plastic ring readily deforms to the shape of the groove, taking on a permanent set. When the system cools, the plastic ring, which has a high coefficient of linear expansion, can shrink a considerable amount and grip the second sealing ring, restricting axial movement of the second sealing ring.

In hydrodynamic seals or gas seals which rely on a cushion of fluid being built up between the faces of the sealing rings, this presents a serious problem when starting up from cold, the spring energised plastic seal preventing separation of the faces, so that they will be subjected to significant wear, which may result in premature failure of the seal.

While the spring energised plastic seal according to the present invention is particularly advantageous with hydrodynamic or gas seals, it is applicable to any application where a spring energised plastic seal may be used, particularly where the spring energised plastic seal is liable to be exposed to high temperatures and pressures.

SUMMARY OF THE INVENTION

In accordance with one aspect of the present invention, a seal between a pair of relatively axially movable coaxial components is provided by a spring energised plastic seal which is located axially with respect to the outer component to separate a high pressure fluid area from a low pressure fluid area, the spring energised plastic seal comprising a plastic ring, the plastic ring having a body portion and a pair of sealing elements extending coaxially to the high pressure side of the body portion, the sealing elements being spaced radially and spring means being located between the sealing elements to urge them apart and into sealing engagement with opposed surfaces of the two components, a projection extending axially from the low pressure side of the body portion adjacent the external diameter thereof, the projection engaging an axial projection on the outer component, the axial projection on the outer component extending towards the high pressure side of the seal and being disposed radially inwardly of the projection on the plastic ring, so that engagement thereof will support the plastic ring radially.

In accordance with the present invention, engagement of the axial projection on the plastic ring with the axial projection on the outer component, will support the body portion of the spring energised plastic seal radially, thus preventing it from shrinking onto the inner component.

According to a preferred embodiment of the invention, the projection on the outer component may be provided by an annular groove in a radial face of the outer component, the projection on the plastic ring being located in the annular groove. The radial face of the outer component is located on the low pressure side of the seal and serves to locate the spring energised plastic seal axially of the components.

The plastic ring of the spring energised plastic seal of the present invention may be made from PTFE, a PTFE composite material or any other suitable plastics material. The plastics materials may, for example, be filled inorganic materials such as glass or carbon; or with other plastics materials such as aramids. The fillers may be in the form of fibres or particles.

In accordance with an alternative embodiment of the invention the plastic ring may be of composite form, having a first part defining the projection for engaging an axial projection on the outer component and a second part defining the sealing formations. The first and second parts of the composite ring have complimentary abutting faces, by which axial loads applied to the second part will generate radial loads urging the first part towards the inner component to close the gap therebetween. The complimentary faces may be of frustroconical or curved configuration and may, for example be stepped or of complex curvature. Preferably the first and second parts of the composite ring are made of dissimilar materials, the first part being made of a stiffer material.

BRIEF DESCRIPTION OF THE DRAWINGS

The invention is now described, by way of example only, with reference to the accompanying drawings, in which.

DESCRIPTION OF THE PREFERRED EMBODIMENTS

Figure 1:
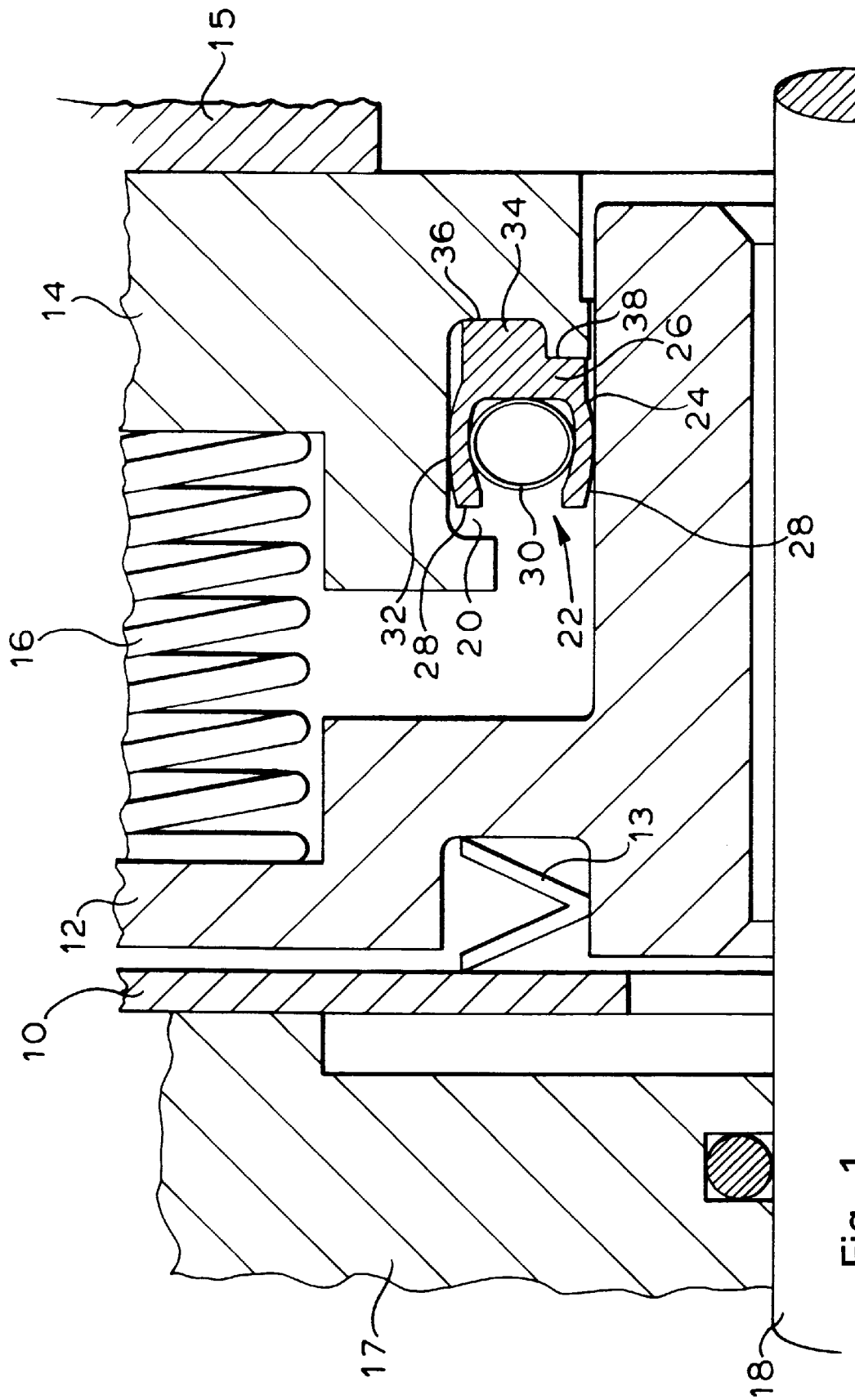
FIG. 1 shows a partial cross-section of a gas seal utilising a spring energised plastic seal in accordance with the present invention.

As illustrated in FIG. 1, a gas seal comprises a sealing ring 10. The sealing ring 10 is mounted on a carrier ring 12 in conventional manner (not shown) and is sealed with respect thereto by means of sealing element 13. The carrier ring 12 is slidably located in a coaxial retainer ring 14 which is adapted to be secured in fixed relationship, to a housing 15. A plurality of angularly spaced compression springs 16 act between the retaining ring 14 and carrier ring 12, to urge the carrier ring 12 and sealing ring 10 mounted thereon, axially into engagement with a complimentary sealing ring 17 which is mounted for rotation on a shaft 18.

Groove patterns are provided in one of the opposed sealing faces of the sealing rings 10 or 17, in order to induce the formation of a cushion of gas between the sealing faces, when the complimentary sealing ring 17 rotates with the shaft 18. The cushion of gas serves to prevent face to face contact between the sealing rings 10 and 17 as they move relative to one another. The sealing ring 10 and complimentary ring 17 are exposed to gas under pressure, on their external diameters.

An annular recess 20 is provided on the retainer ring 14 and a spring energised plastic seal 22 is located in the recess 20, to provide a secondary seal between the retainer ring 14 and the carrier ring 12. The spring energised plastic seal 22 comprises a plastic ring 24 made of, for example, PTFE or a blend of PTFE. The ring 24 has a body portion 26, a pair of sealing elements 28 extending coaxially from one side of the body portion 26, towards the high pressure side of the secondary seal. The sealing elements 28 are spaced radially and an annular helical spring element 30 is located between the spring elements 28, urging them radially apart, one sealing element 28 into sealing engagement with the base 32 of recess 20 and the other sealing element 28 into sealing engagement with a carrier ring 12.

A projection 34 extends axially from the side of the body portion 26 remote from the sealing elements 28, at the external diameter of the body portion 26. The projection 34 engages in an axially extending annular groove 36 in the end wall 38 of recess 20, on the low pressure side of the secondary seal. Engagement of the projection 34 in the groove 36 will support the plastic ring 24 radially with respect to the retainer ring 14 and prevent it from shrinking down onto the carrier ring 12. The carrier ring 12 will consequently be free to move axially of the retainer ring 14.

The pressure of the sealed gas will act to force the sealing elements 28 apart, reinforcing the spring element 30 and will also urge the projection 34 of the plastic ring 24, into engagement with the groove 36.

With the above embodiment there can be a tendency for the PTFE ring 24 to be extruded between the carrier ring 12 and housing 14. This tendency is increased by distortion of the carrier ring 12 under pressure, which reduces the O.D. of the end of the carrier ring 12 remote from sealing ring 10. This problem may be mitigated by the provision of a close clearance between the bore of the housing 14 and the carrier ring 12. However, as a consequence under very high vibration conditions metal to metal fretting may occur.

In order to mitigate the extrusion problem it is also desirable to use highly extrusion resistant materials for the plastic ring 24. Such materials normally require a glass fibre fill, increasing the abrasiveness of the material and consequently wear of the carrier ring 12.

Figure 2:
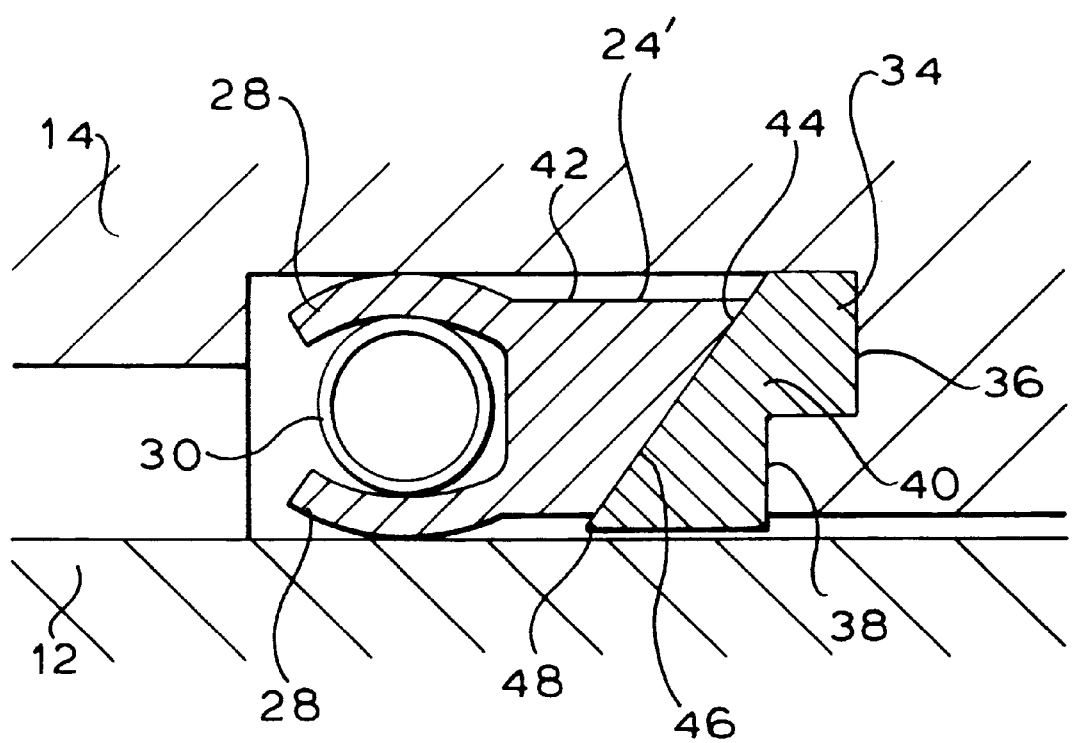
FIG. 2 shows a modification to the spring energised plastic seal illustrated in FIG. 1.

In accordance with the modification illustrated in FIG. 2 of the accompanying drawings, the plastic ring 24' is formed in two parts 40 and 42. The first part or control ring 40, defines the projection 34 for engagement in the annular groove 36 and has a divergent frustroconical end face 44. The second part 42 defines the sealing elements 28 and has a complimentary convergent frustroconical end face 46 for engagement of face 44.

The first part 40 of the composite ring 24' is made of a plastics material which exhibits high strength to resist radial loading, a low coefficient of linear expansion and low frictional properties, for example a carbon fibre filled PTFE composition. The second part 42 of composite ring 24' may be made of plastics material selected principally for their low frictional properties, for example PTFE filled with a linear aromatic polyester, such as Ekonol.

In accordance with this modified embodiment of the invention, the first part 40 of composite ring 24' is located radially by engagement of projection 34 in groove 36. The second part 42 of composite ring 24' is located radially by interengagement of the conical faces 44 and 46.

When the modified seal is subject to fluid pressure, the sealing elements 28 will be forced apart and into sealing engagement with the opposed components 12 and 14 as described above. The interengaging conical faces 44 and 46 will however also apply a radial load to the first part 40 of composite ring 24', so that the nose 48 of the first part 40 is deflected into engagement with the carrier ring 12 to close the gap, so that no extrusion of the second part 42 of composite ring 24' can occur. The first part 40 of composite ring 24' may be designed so that radial deflection of the nose 48 will be at a slightly greater rate than deflection of the carrier ring 12 under pressure, so that engagement of the first part 40 with the carrier ring 12 will be maintained, without excessive loading.

The modification illustrated in FIG. 2 will thereby overcome the problem of extrusion and avoid the need for use of the more abrasive highly extrusion resistant materials. Furthermore, as the first part 40 of the composite ring 24' is made of low friction material, a close clearance may be provided between the I.D. of the first part 40 and the carrier ring 12, thereby minimising the extrusion gap without the risk of metal to metal fretting.

Various modifications may be made without departing from the invention. For example, while in the above embodiments the spring energised plastic seal 22 forms a secondary seal between the sealing ring 10 and the housing 15, the sealing ring 17 may alternatively be mounted for axial movement relative to the shaft 18 and the spring energised plastic seal 22 may provide a secondary seal between sealing ring 17 and the shaft 18.

While in the embodiment illustrated in FIG. 2 the abutting surfaces of the first and second parts of the composite plastic ring are of frustroconical configuration they may alternatively be curved in such a manner that axial loads on the second part of the ring are converted into radially inward loads on the first part. Furthermore the abutting faces may, for example be stepped or of complex curvature. Also while in the embodiment described the first part 40 of the composite ring 28' is deflected into engagement with the carrier ring 12, it is sufficient that the first part 40 is deflected to a degree sufficient to maintain the gap at a close clearance, as the carrier ring 12 deflects under pressure.

What is claimed is:

1. A seal between a pair of relatively axially movable coaxial components is provided by a spring energized plastic seal which is located axially with respect to an outer component to separate a high pressure fluid area from a low pressure fluid area, the spring energized plastic seal comprising a plastic ring, the plastic ring having a body portion which is spaced radially of an inner component and a pair of sealing elements extending coaxially to a high pressure side of the body portion, the sealing elements being spaced radially and spring means being located between the sealing elements to urge the sealing elements apart or into sealing engagement with opposed surfaces of the pair of components, a projection extending axially from a low pressure side of the body portion adjacent an external diameter thereof, the projection engaging an axial projection on the outer component, the axial projection on the outer component extending towards the high pressure side of the seal and being disposed radially inwardly of the projection on the plastic ring, so that engagement thereof will support the plastic ring radially and maintain a radial clearance between the body portion of the plastic ring and the inner component.

2. A seal according to claim 1 in which the projection on the outer component is provided by an annular groove formed in a radial face of the outer component, the radial face being located on the low pressure side of the spring energized plastic seal.

3. A seal according to claim 2 in which the radial face of the outer component is formed by a wall of a circumferential recess in the internal diameter of the outer component, the circumferential recess serving to locate the spring energized plastic seal axially with respect to the components.

4. A seal according to claim 1 in which the plastic ring is formed from a material selected from the group consisting of polytetrafluoroethylene (PTFE), a blend of polytetrafluoroethylene or another suitable plastics material.

5. A seal according to claim 4 in which the plastics material is filled with inorganic filler.

6. A seal according to claim 5 in which the filler is in the form of fibers or particles.

7. A seal between a pair of relatively axially movable coaxial components is provided by a spring energized plastic seal which is located axially with respect to an outer component to separate a high pressure fluid area from a low pressure fluid area, the spring energized plastic seal comprising a plastic ring, the plastic ring having a body portion which is spaced radially of an inner component and a pair of sealing elements extending coaxially to a high pressure side of the body portion, the sealing elements being spaced radially and spring means being located between the sealing elements to urge the sealing elements apart or into sealing engagement with opposed surfaces of the pair of coaxial components, a projection extending axially from a low pressure side of the body portion adjacent an external diameter thereof, the projection engaging an axial projection on the outer component, the axial projection on the outer component extending towards the high pressure side of the seal and being disposed radially inwardly of the projection on the plastic ring so that engagement thereof will support the plastic ring radially and maintain a radial clearance between the body portion of the plastic ring and the inner component, and the plastic ring is of composite configuration having a first part which defines the projection for engagement of the axial projection on the outer component and a second part which defines the sealing elements, the first and second parts having complimentary abutting faces, the abutting faces being adapted to convert axial loads applied to the second part into radial loads urging the first part towards the inner component to close the gap therebetween.

8. A seal according to claim 7 in which the complimentary abutting faces are of frustroconical or curved configuration.

9. A seal according to claim 7 in which the abutting face of the first part is divergent.

10. A seal according to claim 7 in which the first and second parts of the composite plastic ring are made of dissimilar materials.

11. A seal according to claim 7 in which the first part of the composite plastic ring is made of plastics material which exhibits high strength to resist radial loads, a low coefficient of linear expansion and low frictional properties.

12. A seal according to claim 11 in which the first part of the composite plastic ring is made of a carbon fibre filled PTFE composition.

13. A seal according to claim 7 in which the second part of the composite plastic ring is made of a PTFE composition filled with a linear aromatic polyester.

14. A seal according to claim 7 in which the inner diameter of the first part of the composite plastic ring is a close clearance with the inner component.

15. A mechanical seal for providing a fluid tight seal between a pair of relatively rotatable components comprising a first sealing ring mounted in fixed axial and rotational relationship to one component and a second sealing ring mounted in fixed rotational relationship but movable axially of the other component, the second sealing ring being sealed with respect to said other component by means of a seal located between the pair of relatively rotatable components, the seal being provided by a spring energized plastic seal which is located axially with respect to other component to separate a high pressure fluid area from a low pressure fluid area, the spring energized plastic seal comprising a plastic ring, the plastic ring having a body portion which is spaced radially of the one component and a pair of sealing elements coaxially to a high pressure side of the body portion, the sealing elements being spaced radially and spring means being located between the sealing elements to urge the sealing elements apart or into sealing engagement with opposed surfaces of the pair of rotatable components, a projection extending axially from a low pressure side of the body portion adjacent an external diameter thereof, the projection engaging an axial projection on the other component, the axial projection on the other component extending towards the high pressure side of the seal and being disposed radially inwardly of the projection on the plastic ring so that engagement thereof will support the plastic ring radially and maintain a radial clearance between the body portion of the plastic ring and the inner component.

16. A mechanical seal according to claim 15 in which the mechanical seal is a gas seal or a hydrodynamic seal.

17. A seal according to claim 5 in which the inorganic filler is a material selected from the group consisting of glass, carbon, aramids, or another suitable plastic materials.

* * * * *